United States Patent

Holmquest

[15] 3,681,678
[45] Aug. 1, 1972

[54] CONTROLLED POWER SUPPLY WITH TWO THYRISTORS

[72] Inventor: John C. Holmquest, Broadview, Ill.
[73] Assignee: Sola Basic Industries, Inc., Milwaukee, Wis.
[22] Filed: Feb. 1, 1971
[21] Appl. No.: 111,300

[52] U.S. Cl................321/18, 323/22 SC, 323/34, 323/62
[51] Int. Cl..............................H02m 7/20
[58] Field of Search...307/252 N, 252 Q; 321/18, 25; 323/4, 18, 22 SC, 6, 44 R, 48, 62, 34

[56] References Cited

UNITED STATES PATENTS

| | | |
|---|---|---|
| 3,401,329 | 9/1968 | Corey et al................323/22 SC |
| 3,392,310 | 7/1968 | Feinberg..................323/48 X |
| 3,241,043 | 3/1966 | Clarke....................323/22 SC |
| 3,293,537 | 12/1966 | Sola......................323/6 |
| 3,462,671 | 8/1969 | Lawn......................321/18 |
| 3,518,527 | 6/1970 | Russell...................321/18 |

Primary Examiner—A. D. Pellinen
Attorney—Smythe & Moore

[57] ABSTRACT

A regulated d.c. power supply using two thyristors and a high leakage reactance transformer.

4 Claims, 2 Drawing Figures

PATENTED AUG 1 1972  3,681,678

INVENTOR
JOHN C. HOLMQUEST
BY
Smythe & Moore
ATTORNEYS

CONTROLLED POWER SUPPLY WITH TWO THYRISTORS

This invention relates to regulated d.c. power supplies and especially to a thyristor regulated power supply and circuitry.

Various types of apparatus and circuitry have been used for supplying regulated d.c. power, some including a thyristor, and for converting a.c. to a regulated d.c. power supply. The present invention differs from prior devices by arrangement of elements and use of two thyristors utilized so that the conduction angle will be more than 180° so that the conduction will overlap. This invention is an improvement over that shown in copending application Ser. No. 823,875, filed May 12, 1969 now U.S. Pat. No. 3,597,675.

One of the objects of the invention is to provide an improved a.c. to d.c. thyristor regulated power supply.

A further object is to provide an improved utilization of the active control elements.

A further object is to reduce conducting RFI back into the line.

A further object of the invention is to increase the power factor of the power supply.

A still further object is to reduce the total voltage drop and power supply losses.

Another of the objects of the invention is to provide a power supply that can operate reliably from a "soft line" or source of voltage. A "soft line" is one in which the series impedance in the line is high.

In one aspect of the invention, a high leakage transformer has its primary connected to the source of a.c. The core has at least a pair of secondaries, one on each side of the primary with magnetic shunt means or the equivalent therebetween. The secondary windings have a centertap connection which is connected to the load. The other ends of the secondaries are connected together through thyristors which are controlled by a conventional control circuit responsive to load conditions and arranged so that the thyristors can conduct less or more than 180°.

Other objects, features and advantages of the invention will become apparent from the following description and drawings which are merely exemplary.

Figure 1:
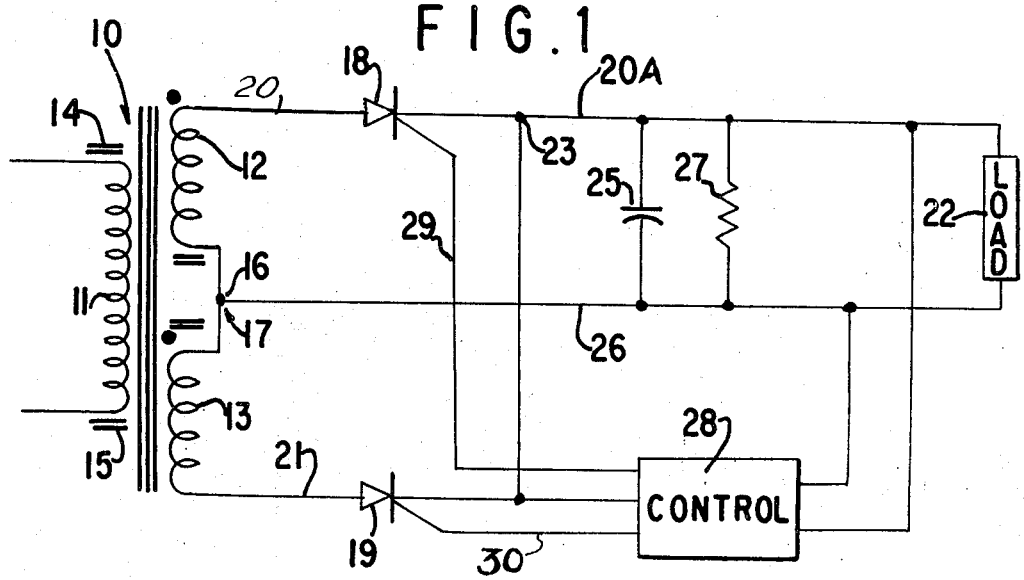
FIG. 1 is a schematic wiring diagram.

Referring to FIG. 1, high leakage reactance transformer 10 has a primary 11. Secondaries 12 and 13 are located on either side of the magnetic shunts indicated schematically by 14 and 15. The secondaries are connected in series at 16 in a centertap configuration 17. Thyristors 18 and 19 are located in leads 20 and 21, respectively, from the other ends of the secondaries. The thyristors are connected together at 23 which is connected to load 22 by lead 20A. Common point 16 is connected by lead 26 to the other side of the load. Capacitor 25 across leads 20A and 26 provides a filtering capacity. Resistor 27 is located across the filter capacitor.

Control circuit 28 is connected across the load and feeds a control signal to thyristors 18 and 19 through lines 29 and 30 in a conventional manner. The control means senses the output voltage and/or current and suitably provides pulses, as is known in the art, to gate the thyristors to maintain the desired output.

The circuit operates in the following manner. Typical operation allows the thyristors to conduct at full load, for example, for 260° conduction angle. For example, at time equals zero, thyristor 18 is gated on and turns on when forward voltage is applied across it. Thyristor 18 then continues to conduct, its current rising very slowly due to the leakage reactance between the primary 11 and secondary 12 energizing thyristor 18. Current continues to increase until it reaches a relatively low steady state condition due to the high reactance of the transformer and the inherent current limiting ability of its effective high reactance. The high reactance may be provided by using a high reactance lamination, a cross-grain lamination, or by the use of external shunts. After 180° conduction, thyristor 19 is then gated on and begins to conduct forward current slowly. The current increases the reluctance of the path linking the primary 11 and the secondary winding 13 thereby causing increased flux to link secondary 12 from the primary. Such increase in the flux leaking between the primary and secondary 12 holds up the output voltage from secondary 12. This will continue to hold forward current across thyristor 18 which allows it to continue to conduct for approximately 250° or 270°, as desired. Eventually, the voltage across secondary 12 drops below the voltage that has been placed on filter capacitor 25 to slowly turn off thyristor 18. It is again gated on at 360° which is only about 90° or 100° after it has just turned off. When the thyristor turns on, there is caused to flow a reverse voltage cycle because the slowly increased current in thyristor 18 now increases the reluctance of the path linking the primary and secondary 12. This increases the flux through secondary 13 holding its current up and thereby holding its current up and thereby holding the forward voltage necessary across thyristor 19 to hold its conduction up. The cycle continues to reverse back and forth in a steady state manner.

Figure 2:
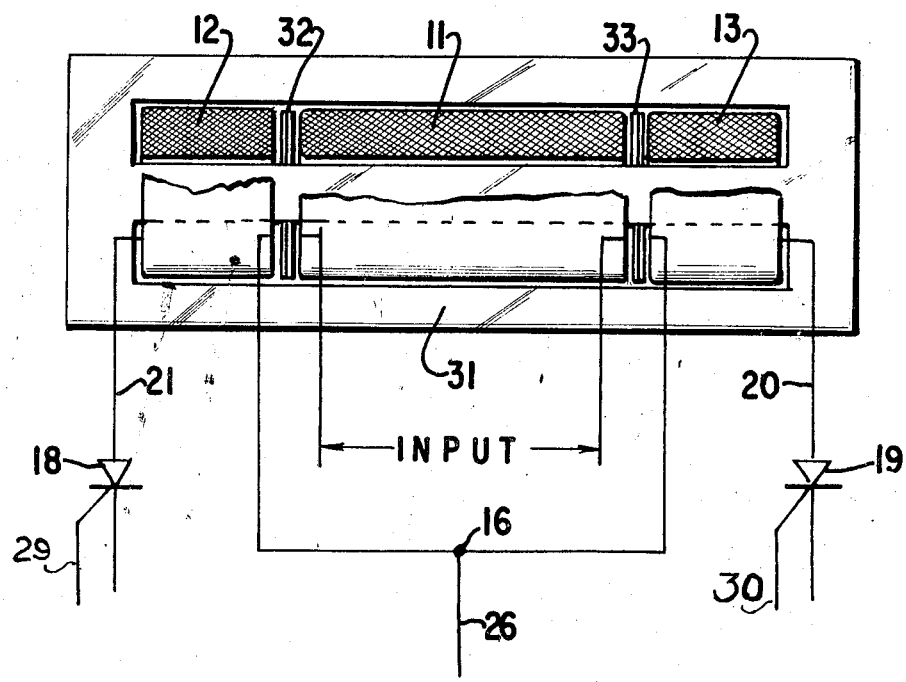
FIG. 2 is a view partially in section of one form of the high leakage reactance transformer.

FIG. 2 shows one example of a configuration of a high leakage reactance transformer wherein the same numerals are used where appropriate. Primary 11 and secondaries 12 and 13 are located on core 31. Core 31 may have magnetic shunts 32 and 33 between the primary and the secondaries on either side thereof.

As an alternative to using shunts in the high reactance transformer, the lamination and size may provide sufficient space between primaries and secondaries to allow for enough reactance between the primaries and secondaries. Another method is to use sufficient material, cross-grain magnetic steel so that permeability of the path is low enough so as to obtain sufficient reactance and leakage reactance between the primary and the secondaries without the use of shunts and appropriate spacing of the coils.

By the phrase "high leakage reactance," it is meant that in terms of the primary circuit, the reactive drop due to the load is in the order to 20 to 60 percent of rating. The short current would be 1½ to 3.3 full load.

It is to be understood that variations may be made in details of arrangement without departing from the spirit of the invention except as defined in the appended claims.

What is claimed is:

1. A d.c. regulated power supply including a high reactance transformer having a core, primary winding means on said core, at least a pair of secondary winding means symmetrically arranged on said core relative to said primary winding means and on either side thereof so that the effect of loading of a secondary winding means on one side affects the flux density of the other secondary winding means, a first of said secondary winding means being connected to a thyristor having an output lead connectable to a load, a second thyristor connected to a second of said secondary means and having its output connected to said output lead, a connection between said secondary means and connected thereto and having a connection to said load, and control means responsive to output condition to control firing angles of said thyristors so that conduction angles will include those over 180°.

2. A power supply as claimed in claim 1 wherein said primary means is seperated from said secondary means by magnetic shunt means.

3. A power supply as claimed in claim 1 having control means for said thyristors which phase shifts the conduction angle thereof in accordance with the input signal to said control means.

4. A power supply as in claim 2 including a capacitor and resistor connected across the output leads.

* * * * *